US011934329B2

(12) United States Patent
Tramoni et al.

(10) Patent No.: US 11,934,329 B2
(45) Date of Patent: Mar. 19, 2024

(54) NFC AND UWB COMMUNICATIONS

(71) Applicant: STMicroelectronics (Rousset) SAS, Rousset (FR)

(72) Inventors: Alexandre Tramoni, Le Beausset (FR); Alexandre Charles, Auriol (FR)

(73) Assignee: STMicroelectronics (Rousset) SAS, Rousset (FR)

(*) Notice: Subject to any disclaimer, the term of this patent is extended or adjusted under 35 U.S.C. 154(b) by 424 days.

(21) Appl. No.: 16/747,246

(22) Filed: Jan. 20, 2020

(65) Prior Publication Data

US 2020/0242063 A1 Jul. 30, 2020

(30) Foreign Application Priority Data

Jan. 30, 2019 (FR) ....................................... 1900860

(51) Int. Cl.

*G06F 13/40* (2006.01)
*G06F 13/376* (2006.01)
*H01Q 5/25* (2015.01)
*H04B 5/00* (2006.01)
*H04L 12/413* (2006.01)
*H04W 4/80* (2018.01)

(52) U.S. Cl.

CPC ........ *G06F 13/4018* (2013.01); *G06F 13/376* (2013.01); *H01Q 5/25* (2015.01); *H04B 5/0031* (2013.01); *H04L 12/413* (2013.01); *H04W 4/80* (2018.02)

(58) Field of Classification Search

CPC ................................................. G06Q 30/0251
See application file for complete search history.

(56) References Cited

U.S. PATENT DOCUMENTS

2011/0212707 A1* 9/2011 Mahalal .................. H04L 63/18 455/411
2016/0156386 A1* 6/2016 Van Nieuwenhuyze .................... G06K 7/10237 455/41.1

FOREIGN PATENT DOCUMENTS

EP 3206305 A1 * 8/2017 ............... H01Q 5/25
EP 3206305 A1 8/2017
EP 3413275 A1 12/2018
WO 2016097462 A1 6/2016

OTHER PUBLICATIONS

Padaki, Aditya V.: (Samsung Research America): "Inclusion of UWB Secure Service Information Element," IEEE Draft; vol. 802.15 EIR: 802.15.4z, Sep. 12, 2018, pp. 108, XP068129308.
INPI Search Report and Written Opinion for FR Appl. No. 1900860 dated Jul. 9, 2019 (8 pages).
First Office Action and Search Report for counterpart CN Appl. No. 202010076446.8, report dated Dec. 9, 2022, 6 pgs.

* cited by examiner

*Primary Examiner* — Henry Tsai
*Assistant Examiner* — Juanito Borromeo
(74) *Attorney, Agent, or Firm* — Crowe & Dunlevy LLC

(57) ABSTRACT

Data exchanges between an ultra-wide band communication module and a secure element are controlled such that the data exchanges pass through a near-field communication router. The near-field communication router controls routing of the data exchanges so that the data exchanges do not pass through a host circuit that is also coupled to the near-field communication router.

26 Claims, 4 Drawing Sheets

UWB ANT
UWB
NFC
SE
HOST/AP
1
3
5
7
9
32
52
54
57
74
94

NFC AND UWB COMMUNICATIONS

PRIORITY CLAIM

This application claims the priority benefit of French Application for Patent No. 1900860, filed on Jan. 30, 2019, the content of which is hereby incorporated by reference in its entirety to the maximum extent allowable by law.

TECHNICAL FIELD

The present disclosure generally concerns electronic circuits and systems and, more specifically, wireless communication circuits. The present disclosure more particularly applies to circuits corresponding to the characteristics of the NFC (Near Field Communications) Forum.

BACKGROUND

Most devices equipped with communication functions, for example, cellular phones, payment terminals, etc. are now equipped with circuits capable of managing near field communications (NFC).

The management of such communications may imply various circuits of the device and, in particular, secure circuits or elements containing authentication, encryption, signature or other keys, functions, or mechanisms, to secure exchanges between the device and external devices.

More recently, ultra-large band (ULB) or ultra-wide band (UWB) communications have appeared which use an antenna different from the antenna used for NFC communications.

There is a need to improve devices having functionalities of near field communication, NFC, and of ultra-wide band communication, UWB.

SUMMARY

An embodiment overcomes all or part of the disadvantages of known NFC and UWB communication devices.

An embodiment provides taking advantage of the presence of a NFC router in a device.

An embodiment provides a device comprising at least: a near field communication router; an ultra-wide band communication module; and a secure element, and wherein exchanges between the ultra-wide band communication module and the secure element pass through the near field communication router.

According to an embodiment, the device further comprises an ultra-wide band antenna having the ultra-wide band communication module coupled, preferably connected, thereto.

According to an embodiment, the device further comprises a near field communication antenna having the near field communication router coupled, preferably connected, thereto.

An embodiment provides a cellular phone comprising a device such as described.

An embodiment provides a method of managing exchanges between an ultra-wide band communication module and a secure element, wherein said exchanges pass through a near field communication router.

According to an embodiment, the near field communication router, the ultra-wide band communication module, and the secure element are distinct integrated circuits.

According to an embodiment, the near field communication router and the secure element form part of a same integrated circuit.

According to an embodiment, the near field communication router, the ultra-wide band communication module, and the secure element form part of a same integrated circuit.

According to an embodiment, exchanges between the ultra-wide band communication module and any circuit coupled to the near field communication router pass through said router.

An embodiment provides a memory of a near field communication router containing instructions adapted to the implementation of the described method.

An embodiment provides a computer program product comprising instructions adapted to the implementation of the described method.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
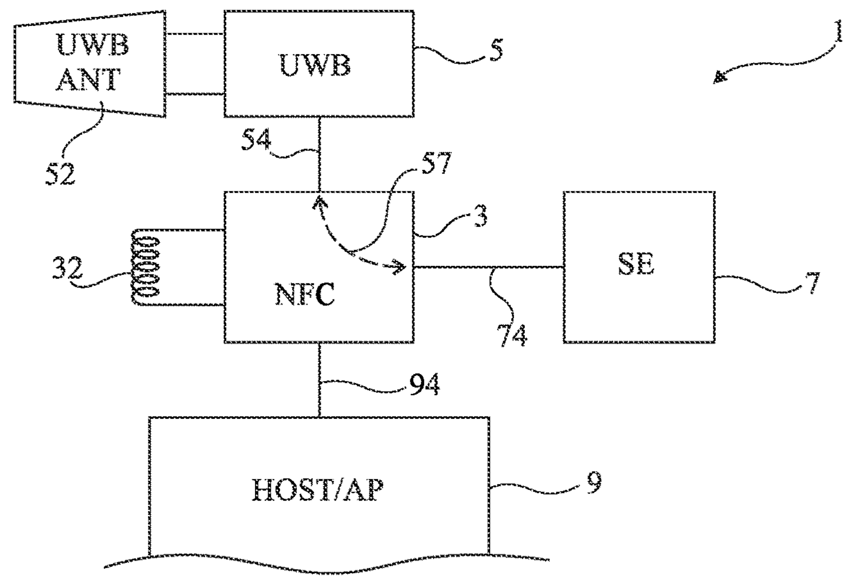
FIG. 1 very schematically and partially shows in the form of blocks an embodiment of elements of a device equipped with functions of near field communication (NFC) and ultra-wide band communication (UWB)

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the detail of the near field or ultra-wide band communications, as well as the protocols of exchange with a secure element, has not been detailed, the described embodiments being compatible with usual communications or protocols.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

The described embodiments apply to any device equipped with functionalities of near field communication (NFC) and of ultra-wide band communication (UWB). Although reference is made hereafter to an example of application to a cellular phone, all that is described more generally applies to any device, portable or not, comprising or not a self-contained power source (battery).

In a cellular phone, many applications require an access to a secure element. The secure element generally comprises a secure microprocessor. The secure element may be supported by different components or circuits, for example, external components or circuits such as a SIM (Subscriber Identity Module) card, a microSD card (Micro Secure Digital Card), etc., or internal components or circuits such an embedded secure element (eSE), an integrated secure Element (iSE), a universal integrated circuit card (UICC), etc.

In a cellular phone (more generally a device) equipped with NFC functionalities, the phone comprises a NFC router, module, or transceiver circuit having the function of switching communications between the near field communication antenna and the different applications hosted by the phone. Further, in case of applications using a secure element, the NFC router, module, or circuit is in charge of switching exchanges between the outside of the device and the secure element.

For the operation of UWB applications, a UWB antenna which equips the phone is coupled to a UWB module, router, or transceiver circuit in charge of switching UWB communications towards the different phone applications.

Reference will be made hereafter to a NFC router and to a UWB module, knowing that these elements may indifferently be called router, module, circuit, etc.

The need to integrate UWB functionalities in phones creates a need for sharing the secure element(s) of the phone or device between the UWB module and the NFC router.

It could be devised to individually couple the NFC router and the UWB module to the secure element. This would, however, require providing a specific arbitration mechanism at the level of the secure element to manage possible conflicts between the NFC router and the UWB module. This would, however, complicate a possible priority management in accesses to the secure element.

One could also think of passing the exchanges by a host circuit or processor that usually manages the exchanges between the NFC router and the other circuits of the device. However, this would make the exchanges more complex and occupy the bandwidth of this host circuit.

The described embodiments originate from a new analysis of the functional and structural needs of access to a secure element by a UWB module with respect to those of a NFC router.

According to the described embodiments, it is provided to take advantage of the presence, in a NFC router, of communication ports processed by the NFC router to switch them towards the secure element(s) of the phone. Rather than connecting the UWB module directly to the secure element, it is connected to a port of the NFC router integrated in the phone.

This enables not only to spare a connection at the secure element level, but also to ease the management of requests to the secure element. Indeed, exchanges between the NFC router and the different elements to which it is coupled are managed by a routing table. Thus, the priorities between the different applications and/or circuits are managed by the routing table according to a programming thereof, usual per se.

The different described embodiments provide coupling the UWB transceiver module to the NFC transceiver router. Exchanges between the UWB circuit and at least one secure element then pass through this NFC router or circuit.

Reference will be made hereafter, for simplification, to a secure element (SE) equipping the phone. However, all that it described applies whatever the number of secure elements of the phone. Thus, the management by the NFC router of the branching of communications between the UWB module and the rest of the phone may concern all or part of the secure elements thereof, preferably, all the secure elements. Similarly, according to a preferred embodiment, the NFC router switches not only exchanges between the UWB module and the secure elements, but also exchanges between the UWB module and other circuits of the phone, preferably, all the other circuits of the phone with which it is capable of communicating. The UWB module is then considered as a peripheral connected to the NFC router. This simplifies the integration of a UWB module in existing phone architectures.

Embodiments of a device equipped with an ultra-wide band communication module and of a method of managing exchanges between an ultra-wide band communication module and a secure element are described hereafter.

FIG. 1 very schematically and partially shows in the form of blocks an embodiment of elements of a device equipped with functions of near field communication (NFC) and ultra-wide band communication (UWB).

Device 1, or phone, comprises a near field communication router 3 (NFC) coupled to a near field transceiver antenna 32.

Phone 1 also comprises an ultra-wide band (UWB) communication module 5, coupled to an UWB transceiver antenna 52 (UWB-ANT).

In the example shown, it is assumed that router 3 and module 5 each comprise the respective NFC and UWB radio frequency (RF) transceiver circuits and the circuits for demodulation in receive mode and for modulation in transmit mode required for the communications. Thus, the exchanges between router 3 and the rest of the phone, and between module 5 and the rest of the phone, are digital exchanges.

The phone 1 having the described embodiments applying thereto also comprises at least one secure element 7 (SE). The telephone 1 further comprises a processor or host circuit whose role is, among other things, to relay communications between the NFC router and applications hosted by the phone. This host circuit as well as the rest of the circuits of the phone 1 are illustrated by a block 9 (HOST/AP) symbolizing the master or host circuits and processor of the phone as well as the different applications using the communications, be they in near field, ultra-wide band, or whether they fulfill other standards such as Bluetooth, GSM, WiFi, etc., the circuits of which have not been detailed.

As illustrated in FIG. 1, a digital bus 54 of the UWB module 5 is coupled, preferably connected, to NFC router 3.

The nature of bus 54 depends on the application and on the bus(es) and protocols supported by the port of the NFC router 3 having module 5 coupled thereto. It is, for example, a parallel bus, a serial bus of SWP (Single Wire Protocol) type, a serial bus of I2C (Inter-Integrated Circuit) type, etc. Preferably, bus 54 is a serial bus of SPI (Serial Peripheral Interface) type. Thus, the UWB module is not connected directly to the host circuit 9 or to the secure element 3. Any transaction between the module 5 and one of the telephone circuits passes through the router 3.

Router 3 is further coupled, preferably connected, to secure element 7 by a digital bus 74. The nature of bus 74 depends on the application and on the bus(es) and protocols supported by the port of the secure element 7 having router 3 coupled thereto. It is for example a parallel bus, a serial bus of SPI (Serial Peripheral Interface) type, a serial bus of I2C (Inter-Integrated Circuit) type, etc. Preferably, bus 74 is a serial bus of SPI (Single Wire Protocol) type.

Router 3 is also coupled, preferably connected, to host circuit 9 by a digital bus 34/94. The nature of bus 34/94 depends on the application and on the bus(es) and protocols supported by the port of the host circuit 9 having router 3 coupled thereto. It is for example a parallel bus, a serial bus of SPI (Serial Peripheral Interface) type, a serial bus of SWP (Single Wire Protocol) type, etc. Preferably, bus 34/94 is a serial bus of I2C (Inter-Integrated Circuit) type.

Although this has not been shown in the drawings for simplification, router 3 may be coupled to other circuits of phone 1, with such other circuits being other secure elements or circuits having other functions.

According to the described embodiments, any exchange (symbolized by a dotted line 57 in FIG. 1) between UWB module 5 and secure element 7 passes through NFC router 3, without going through the host circuit 9 of the phone 1.

Thus, exchanges between UWB module 5 and host circuit 9, and more generally any exchange between module 5 and the rest of phone 1, pass through NFC router 3.

Figure 2:
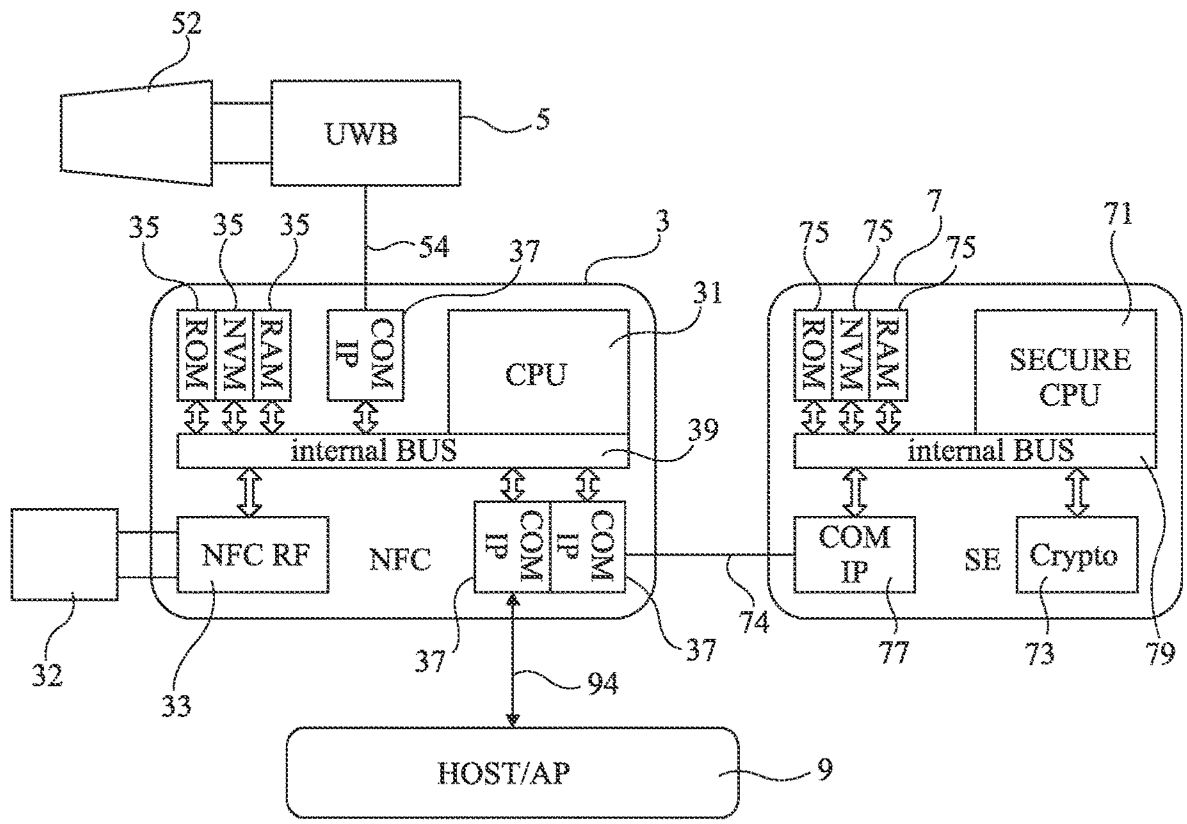
FIG. 2 is a more detailed simplified view in the form of blocks of the embodiment of FIG. 1.

FIG. 2 is a more detailed simplified view in the form of blocks of the embodiment of FIG. 1.

According to this embodiment, NFC router 3, UWB module 5, and secure element 7 are distinct integrated circuits, preferably assembled on a same printed circuit board (PCB).

In the shown example, NFC router 3 comprises at least: a central processing unit 31 (CPU) or microprocessor; a near field radio frequency (NFC RF) transceiver head 33 or circuit coupled, preferably connected, to antenna 32; one or a plurality of memories 35, among which may comprise one or a plurality of ROMs and/or one or a plurality of rewritable non-volatile memories (NVM) and/or one or a plurality of RAMs; internal ports 37 (COM IP) of communication (communication interface) with different circuits coupled to router 3; and one or a plurality of internal buses 39 (Internal BUS) having the exchanges between the different components of router 3 passing therethrough.

Functionally, router 3 contains a routing table which is, for example, stored in a non-volatile memory (NVM) and which contains the parameters for the switching of the different exchanges between the circuits and applications coupled to router 3.

In the example of FIG. 2, three ports 37 are respectively coupled, preferably connected, to UWB module 5 (bus 54), to secure element 7 (bus 74), and to host circuit 9 (bus 34/94).

In the shown example, secure element (SE) 7 comprises at least: a secure central processing unit 71 (SECURE CPU) or secure microprocessor; a cryptographic module or processor 73 (CRYPTO), in charge of securely implementing the authentication and/or ciphering and/or signature mechanisms according to the nature of secure element 7; one or a plurality of memories 75, comprising one or a plurality of ROMs and/or one or a plurality of rewritable non-volatile memories (NVM) and/or one or a plurality of RAMs; at least one internal port 77 (COM IP) of communication (communication interface) with router 3 (bus 74); and one or a plurality of internal buses 79 (Internal BUS) having the exchanges between the different components of element 7 passing therethrough.

Although this has not been detailed in the drawings, UWB module 5 generally comprises the same type of circuit as router 3, that is, central processing unit, memories, internal bus, transceiver circuit (here, ultra-wide band), and internal communication ports.

Figure 3:
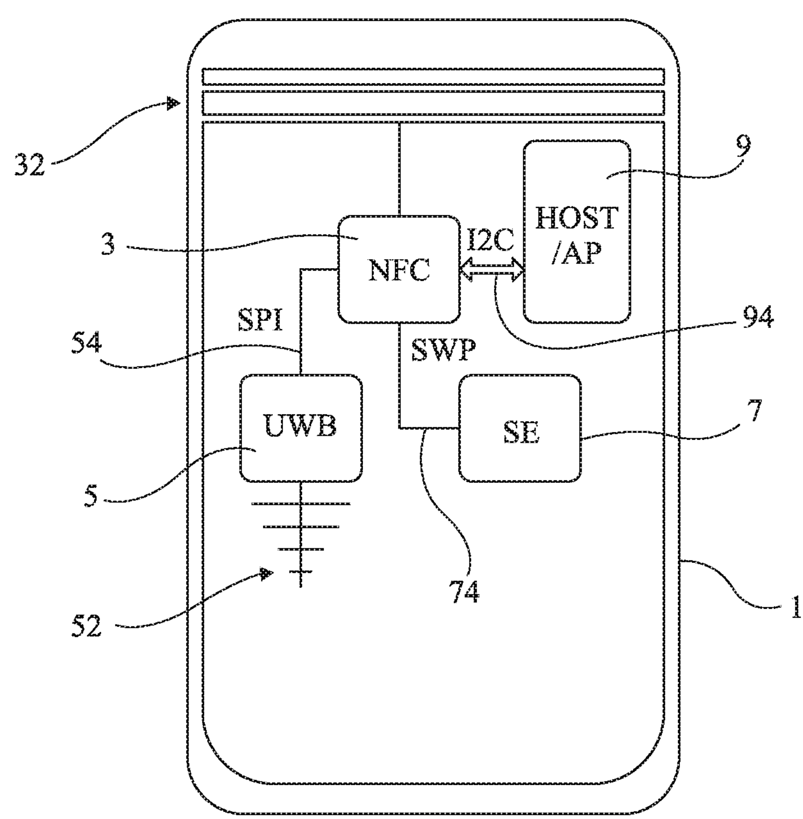
FIG. 3 very schematically shows in the form of blocks an embodiment of a cellular phone equipped with the functions described in FIGS. 1 and 2.

FIG. 3 very schematically shows in the form of blocks, an embodiment of a cellular phone 1 equipped with the functions described in FIGS. 1 and 2.

This drawing symbolically shows the different circuits shown in FIG. 1, that is: a block 3 illustrating the near field communication router (NFC); a block 5 illustrating the ultra-wide band (UWB) communication module; a block 7 illustrating the secure element (SE); a block 9 illustrating host circuit(s) (HOST/AP); a near field communication antenna 32, generally associated with a GSM antenna; an ultra-wide band UWB communication antenna 52; and buses 54, 74, and 34/94, respectively, in the present example, SPI, SWP, and I2C, of communication between router 3 and respectively module 5, element 7, and circuit 9.

Figure 4:
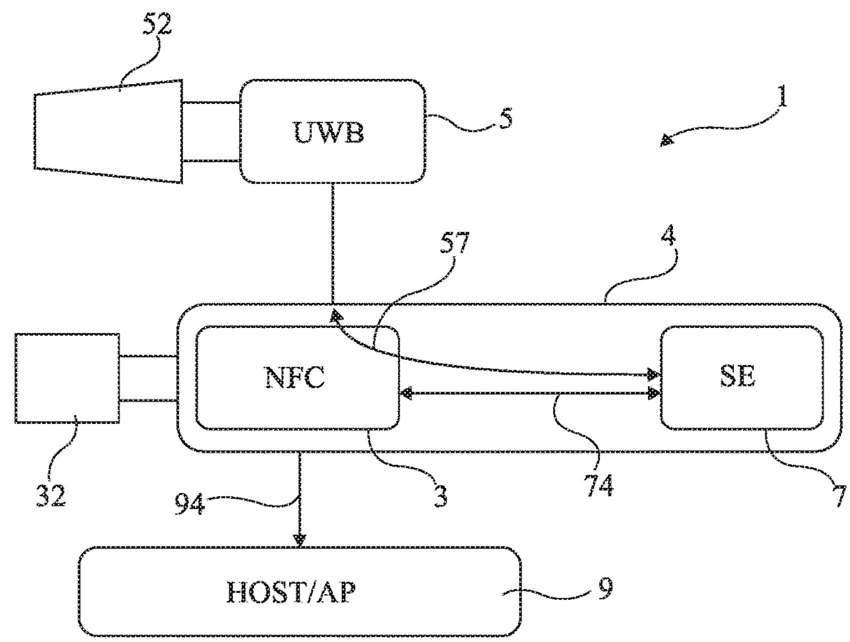
FIG. 4 very schematically and partially shows in the form of blocks another embodiment of elements of a device equipped with functions of near field communication (NFC) and ultra-wide band communication (UWB)

FIG. 4 very schematically and partially shows in the form of blocks another embodiment of elements of a device equipped with functions of near field communication (NFC) and ultra-wide band communication (UWB).

The embodiment of FIG. 4 shows the components of FIG. 1, with the difference that near field communication (NFC) router 3 and secure element 7 (SE) of phone 1 are both integrated within a same circuit 4. The rest of the elements are similar to those described in relation with FIG. 1.

Figure 5:
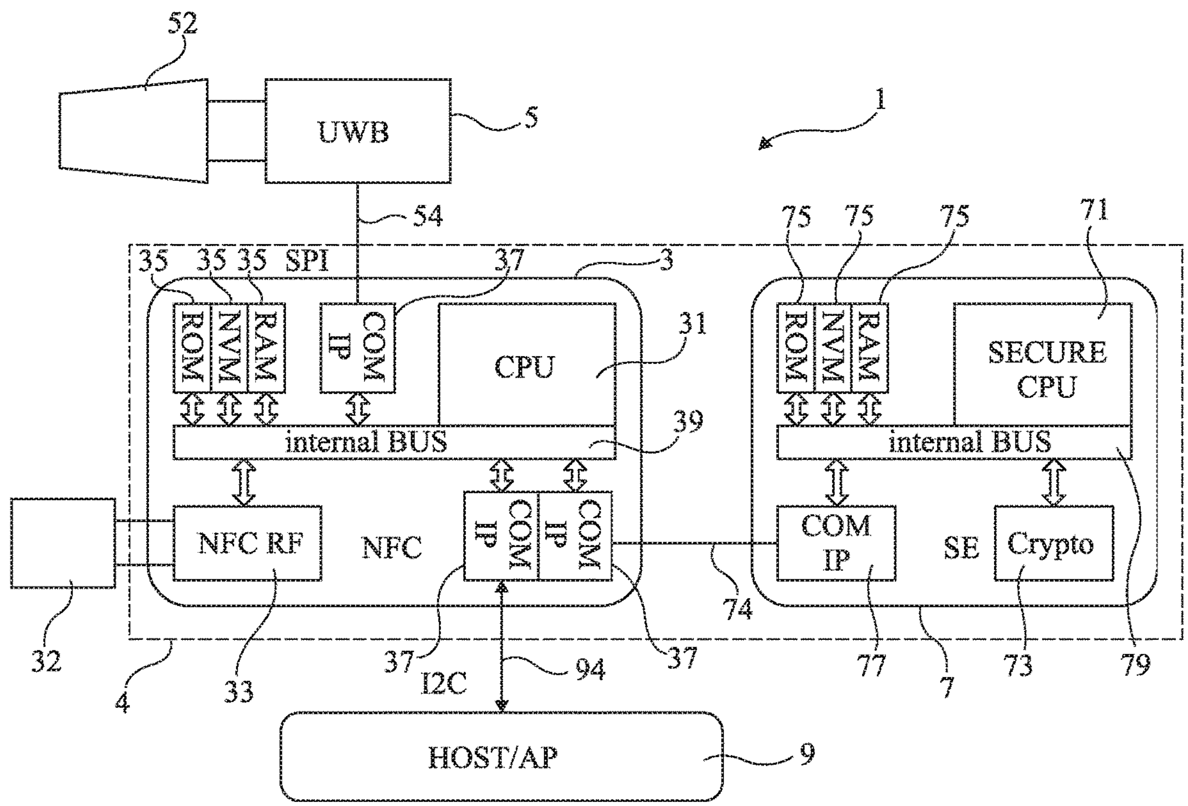
FIG. 5 is a more detailed simplified view in the form of blocks of the embodiment of FIG. 4.

FIG. 5 is a more detailed simplified view in the form of blocks of the embodiment of FIG. 4.

FIG. 5 transposes to the embodiment of FIG. 4 the details described in relation with FIG. 2 for the embodiment of FIG. 1.

Figure 6:
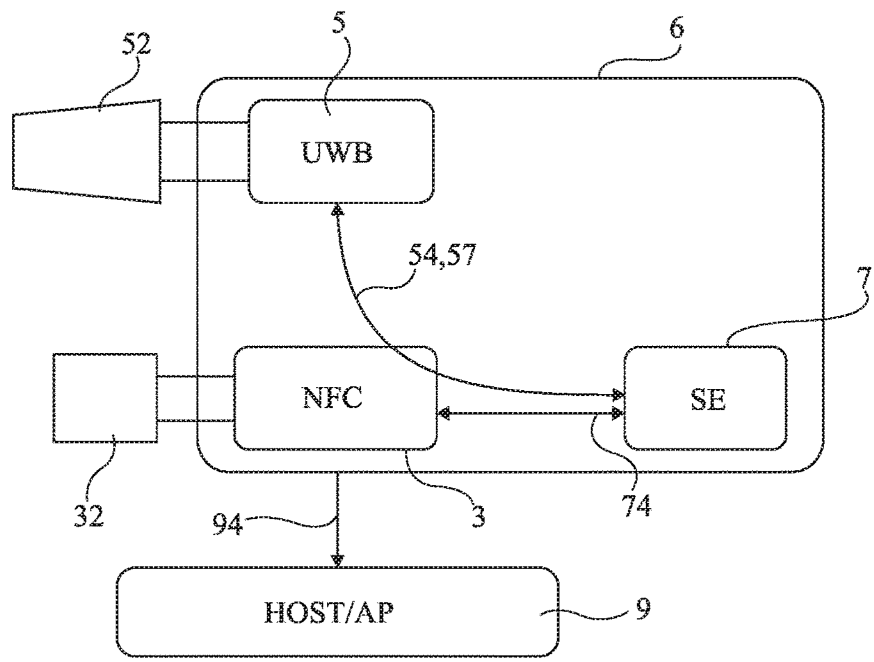
FIG. 6 very schematically and partially shows in the form of blocks another embodiment of elements of a device equipped with functions of near field communication (NFC) and ultra-wide band communication (UWB)

FIG. 6 very schematically and partially shows in the form of blocks another embodiment of elements of a device equipped with functions of near field communication (NFC) and ultra-wide band communication (UWB).

The embodiment of FIG. 6 shows the components of FIG. 1, with the difference that near field communication (NFC) router 3, ultra-wide band communication module 5 (UWB), and secure element 7 (SE) of phone 1 are all three integrated within a same circuit 6. The rest of the elements are similar to those described in relation with FIG. 1.

Figure 7:
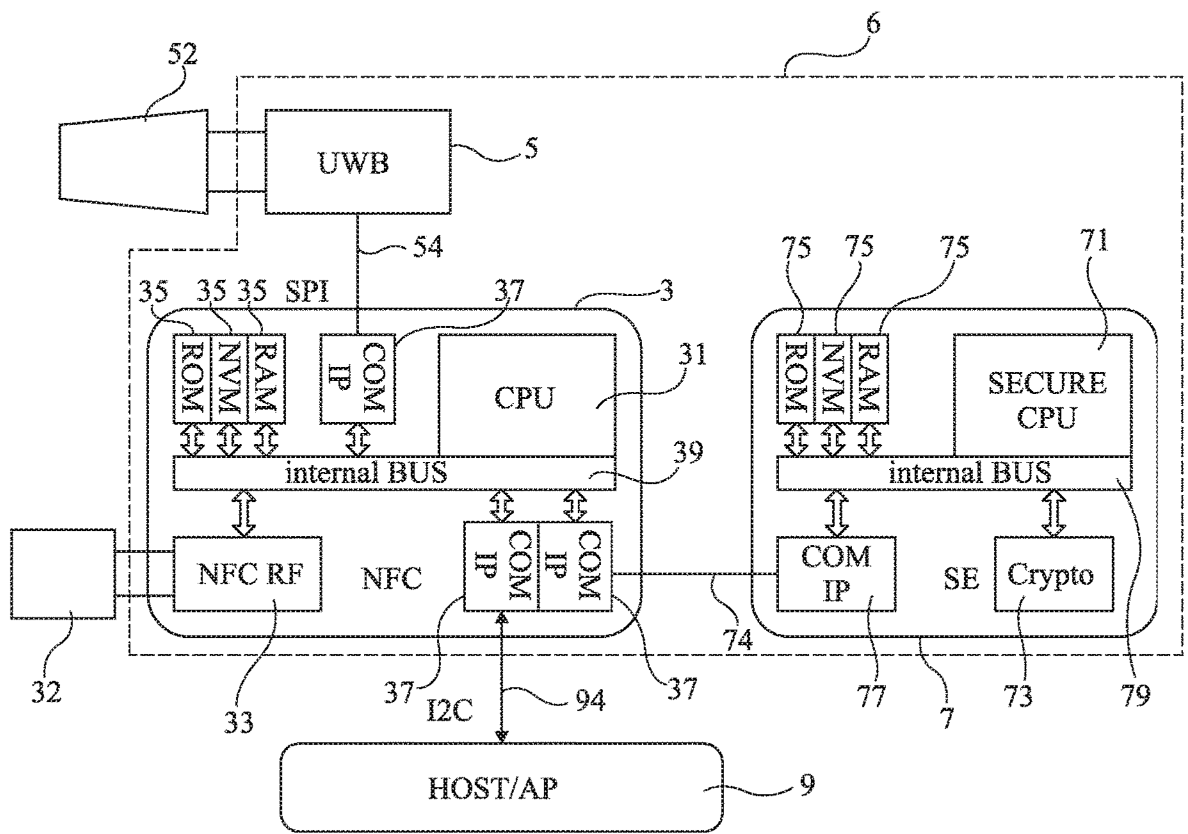
FIG. 7 is a more detailed simplified view in the form of blocks of the embodiment of FIG. 6.

FIG. 7 is a more detailed simplified view in the form of blocks of the embodiment of FIG. 6.

FIG. 7 transposes to the embodiment of FIG. 6 the details described in relation with FIG. 2 for the embodiment of FIG. 1.

An advantage of the described embodiments is that UWB communication management is particularly simple in that, regardless of the circuit (secure element, host circuit, etc.) of the recipient telephone or transmitter of the transaction, everything passes through the NFC router.

Various embodiments and variations have been described. It will be understood by those skilled in the art that certain features of these various embodiments and variations may be combined, and other variations will occur to those skilled in the art. In particular, the selection between the different embodiments depends on the architecture of the phone.

Finally, the practical implementation of the described embodiments and variations is within the abilities of those skilled in the art based on the functional indications given hereabove. In particular, the management of exchanges between the NFC router, the UWB module, and the secure element is easily programmable at the level of the phone circuits. For example, it may be provided for the secure element to be assigned as a priority to NFC applications and for the NFC router to hand over to the UWB module once it has ended its own exchanges with the secure element. Further, the exchange management may be performed according to a parameterizing of a routing table contained in the form of a table or in the form of instructions in the near field communication router. Similarly, the implementation of the described mechanisms in software form may use a computer program (or computer program product) comprising instructions to implement the described management method.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device, comprising:

a near field communication router including a first port, a second port and a third port;

an ultra-wide band communication module coupled for data communication over a first bus connected to the first port of the near field communication router;

a host circuit coupled for data communication over a second bus connected to the second port of the near field communication router; and a secure element coupled for data communication over a third bus connected to the third port of the near field communication router;

wherein data exchanges between the ultra-wide band communication module and the secure element pass through the near field communication router between the first and third ports connected to the first and third buses, respectively, and without passing through the second port, second bus and the host circuit.

2. The device of claim 1, further comprising an ultra-wide band antenna that is coupled to the ultra-wide band communication module.

3. The device of claim 1, further comprising a near field communication antenna that is coupled to the near field communication router.

4. The device of claim 1, wherein data exchanges between the ultra-wide band communication module and any circuit coupled to the near field communication router pass through said router.

5. The device of claim 1, wherein the near field communication router, the ultra-wide band communication module, and the secure element are implemented on distinct integrated circuits.

6. The device of claim 1, wherein the near field communication router and the secure element are implemented on a same integrated circuit.

7. The device of claim 1, wherein the near field communication router, the ultra-wide band communication module, and the secure element are implemented on a same integrated circuit.

8. The device of claim 1, wherein the device is a component of a cellular phone.

9. A device, comprising:

a near field communication router;

an ultra-wide band communication module coupled for data communication to the near field communication router over a first bus;

a host circuit coupled for data communication to the near field communication router over a second bus; and a secure element coupled for data communication to the near field communication router over a third bus;

wherein the near field communication router includes routing means for controlling data exchanges between the ultra-wide band communication module and the secure element without passing through the host circuit, said routing means comprising:

a communications bus;

a first port coupling the communications bus to the ultra-wide band communication module;

a second port coupling the communications bus to the secure element; and a third port coupling the communications bus to the host circuit;

wherein the transmission of the data exchanges is controlled so as to not pass through the third port.

10. A method of managing data exchanges between an ultra- wide band communication module and a secure element, wherein said data exchanges pass through a near-field communication router without passing through a host circuit coupled to the near-field communication router, wherein the near-field communication router includes a first port coupled to the ultra-wide band communication module, a second port coupled to the secure element, and a third port coupled to the host circuit, said method further comprising controlling transmission of said data exchanges so as to not pass through the third port.

11. The method of claim 10, wherein data exchanges between the ultra-wide band communication module and any circuit coupled to the near field communication router pass through said router.

12. The method of claim 10, wherein the near field communication router, the ultra-wide band communication module, and the secure element are implemented on distinct integrated circuits.

13. The method of claim 10, wherein the near field communication router and the secure element are implemented on a same integrated circuit.

14. The method of claim 10, wherein the near field communication router, the ultra-wide band communication module, and the secure element are implemented on a same integrated circuit.

15. A method of managing data exchanges between an ultra-wide band communication module and a secure element, wherein said data exchanges pass through a near-field communication router without passing through a host circuit coupled to the near-field communication router, wherein the near-field communication router includes a communications bus, a first port coupling the communications bus to the ultra-wide band communication module, a second port coupling the communications bus to the secure element, and a third port coupling the communications bus to the host circuit, said method further comprising controlling transmission of the data exchanges so as to not pass through the third port.

16. The method of claim 15, wherein data exchanges between the ultra-wide band communication module and any circuit coupled to the near field communication router pass through said router.

17. The method of claim 15, wherein the near field communication router, the ultra-wide band communication module, and the secure element are implemented on distinct integrated circuits.

18. The method of claim 15, wherein the near field communication router and the secure element are implemented on a same integrated circuit.

19. The method of claim 15, wherein the near field communication router, the ultra-wide band communication module, and the secure element are implemented on a same integrated circuit.

20. The device of claim 9, further comprising an ultra-wide band antenna that is coupled to the ultra-wide band communication module.

21. The device of claim 9, further comprising a near field communication antenna that is coupled to the near field communication router.

22. The device of claim 9, wherein data exchanges between the ultra-wide band communication module and any circuit coupled to the near field communication router pass through said router.

23. The device of claim 9, wherein the near field communication router, the ultra-wide band communication module, and the secure element are implemented on distinct integrated circuits.

24. The device of claim 9, wherein the near field communication router and the secure element are implemented on a same integrated circuit.

25. The device of claim 9, wherein the near field communication router, the ultra-wide band communication module, and the secure element are implemented on a same integrated circuit.

26. The device of claim 9, wherein the device is a component of a cellular phone.

* * * * *